United States Patent [19]

Lew

[11] Patent Number: 4,911,022

[45] Date of Patent: Mar. 27, 1990

[54] FLOWMETER WITH A FLUID DYNAMIC TARGET

[76] Inventor: Hyok S. Lew, 7890 Oak St., Arvada, Colo. 80005

[21] Appl. No.: 231,712

[22] Filed: Aug. 15, 1988

Related U.S. Application Data

[63] Continuation-in-part of Ser. No. 227,027, Mar. 5, 1987, Pat. No. 4,777,830.

[51] Int. Cl.$^4$ ............................................. G01F 1/28
[52] U.S. Cl. ................................................. 73/861.75
[58] Field of Search ........... 73/861.71, 861.72, 861.74, 73/861.75, 861.76

[56] References Cited

U.S. PATENT DOCUMENTS 2,302,672  11/1942  Buckley ................. 73/861.71 X
2,917,922  12/1959  Morse ..................... 73/861.71

FOREIGN PATENT DOCUMENTS 0034116  2/1984  Japan ................................ 73/861.76

Primary Examiner—Herbert Goldstein

[57] ABSTRACT

The flowmeter of the present invention comprises a fluid dynamic target of an elongated planar geometry having an airfoil shaped cross section disposed generally parallel to the direction of the fluid flow and extending into the fluid stream, which is supported in a rotating arrangement about an axis generally parallel to the lengthwise axis of the fluid dynamic target wherein the airfoil shaped cross section remains generally parallel to the direction of the fluid flow during the rotating movement of the fluid dynamic target, which rotating movement is biased by a mechanical spring or the Earth's gravitational force. The time rate of the fluid flow is determined from the angular displacement of the fluid dynamic target about the rotating axis, which angular displacement results from a combination of the lift and drag forces on the fluid dynamic target created by the fluid flow moving therearound.

7 Claims, 2 Drawing Sheets

FLOWMETER WITH A FLUID DYNAMIC TARGET

BACKGROUND OF THE INVENTION

This patent application is a continuation-in-part application to Ser. No. 07/022,027 entitled "Flowmeter with pivotably floating fluid dynamic target" filed on Mar. 5, 1987, now U.S. Pat. No. 4,777,830.

One of the most common methods employed in the measurement of the fluid flow is to measure the dynamic pressure of the fluid flow that is equal to one half of the fluid density times the square of the fluid velocity, wherefrom the rate of volume flow and/or mass flow is determined after substituting the known or measured value of the fluid density thereinto. With few exceptions, the dynamic pressure of the fluid flow is measured by a Pitot tube of one or another type of design. As the dynamic pressure is proportional to the square of the fluid velocity, the magnitude thereof becomes very small when the fluid velocity is very low. A device such as the Pitot tube that directly measures the dynamic pressure without an amplification means, is not capable of measuring the low velocity of the fluid flow. One way to amplify the dynamic pressure in the flow measurement thereby is to measure the force or displacement of a fluid dynamic target with a large fluid dynamic surface created by the dynamic pressure acting thereon.

BRIEF SUMMARY OF THE INVENTION

The primary object of the present invention is to provide a flowmeter comprising a planar fluid dynamic target having an airfoil shaped cross section and extending into the fluid stream, that is disposed in an off set and parallel arrangement with respect to an orbiting axis generally perpendicular to the airfoil shaped cross section, wherein the planar fluid dynamic target is orbitable about the orbiting axis without experiencing a rotation about its own axis generally parallel to the orbiting axis. The volume and/or mass flow rate of the fluid is determined from the angular displacement of the planar fluid dynamic target about the orbiting axis, which takes place against the bias torque provided by a mechanical spring or the Earth's gravitational force as a result of the drag and lift forces exerted on the planar fluid dynamic target by the moving fluid.

Another object is to provide a flowmeter comprising the planar fluid dynamic target, which is positively restrained from rotating about its own axis perpendicular to the airfoil shaped cross section thereof by a mechanical motion coupling means during the orbiting movement thereof about the orbiting axis.

A further object is to provide a flowmeter comprising the planar fluid dynamic target, which is freely rotatable about its own axis perpendicular to the airfoil shaped cross section thereof, wherein the fluid dynamic torque exerted thereon by the moving fluid maintains a constant angle of attack of the planar fluid dynamic target relative to the direction of the fluid flow during the orbiting movement thereof about the orbiting axis.

Yet another object of the present invention is to provide a flowmeter comprising one or more planar fluid dynamic targets with an airfoil shaped cross section, which are affixed to an elongated member in a perpendicular relationship therebetween, wherein elongated member is supported orbitably about an orbiting axis generally perpendicular to the airfoil shaped cross section without experiencing any pivoting movement thereof. The volume and/or mass flow rate of the fluid is determined from the angular displacement of the elongated member about the orbiting axis, which takes place against a bias torque provided by a mechanical spring or the Earth's gravitational force as a result of the drag and lift forces exerted on the planar fluid dynamic target by the moving fluid.

Yet a further object is to provide a flowmeter with the planar fluid dynamic target including a remotely readable angular position transducer that measures the angular displacement of the fluid dynamic target about the orbiting axis.

These and other objects of the present invention will become clear as the description thereof progresses.

BRIEF DESCRIPTION OF THE FIGURES

The present invention may be described with a great clarity and specificity by referring to the following figures.

DESCRIPTION OF THE ILLUSTRATED EMBODIMENTS

Figure 1:
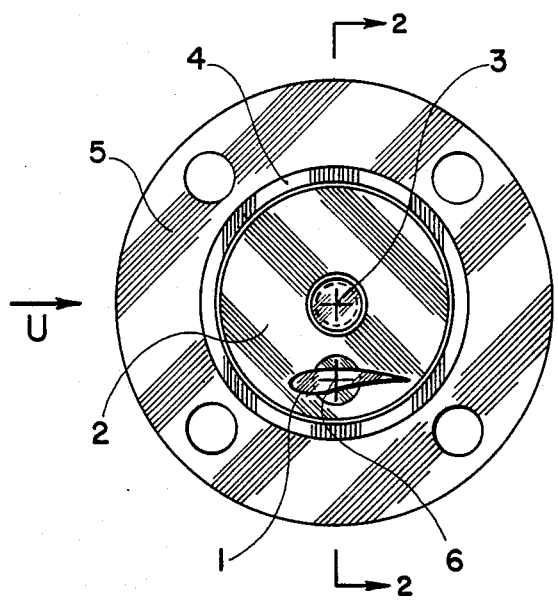
FIG. 1 illustrates an end view of an embodiment of the flowmeter comprising a planar fluid dynamic target.

In FIG. 1 there is illustrated an end view of an embodiment of the flowmeter constructed in accordance with the principles of the present invention. A fluid dynamic target 1 of an elongated planar geometry having an airfoil shaped cross section is rotatably supported by a rotary support 2 in an eccentric arrangement with respect to the central axis 3 of the rotary member, which fluid dynamic target extends from one extremity of the rotary member 2 into the fluid stream. The rotary support 2 is disposed within a container vessel 4 with a mounting flange 5 that is to be secured to the wall of the flow passage. The planar fluid dynamic target 1 rotates about its own axis 6 as it orbits about the central axis 3 of the rotary support 2 in such a way that the chord of the airfoil shaped cross section remains generally parallel to the direction of the fluid velocity U.

Figure 2:
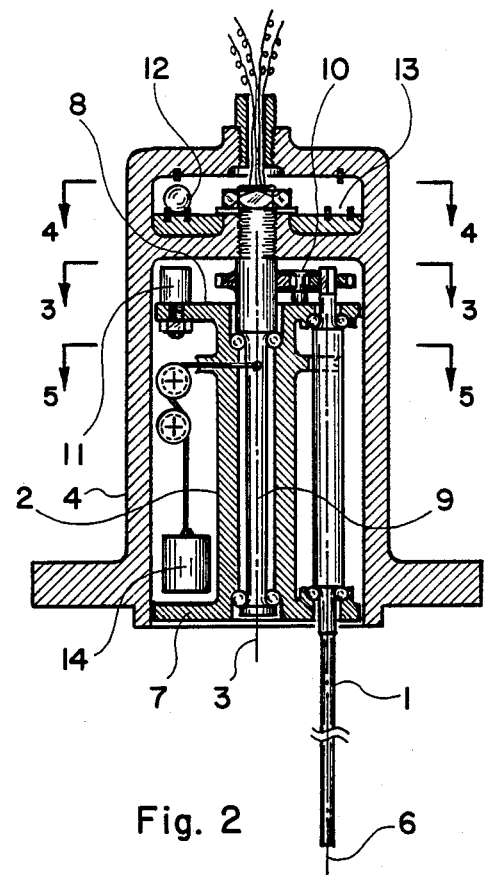
FIG. 2 illustrates a cross section of the flowmeter shown in FIG. 1.

In FIG. 2 there is illustrated a cross section of the flowmeter shown in FIG. 1, which cross section is taken along plane 1—1 as shown in FIG. 1. The root section of the planar fluid dynamic target 1 is rotatably supported by a pair of circular flanges 7 and 8 of the rotary support 2 that is rotatably supported by a journal post 9 affixed to the container vessel 4 with mounting flange 5, whereby the planar fluid dynamic target 1 is rotatable about its own axis 6 while it orbits about the central axis 3 of the rotary support 2. The rotating motion of the planar fluid dynamic target 1 about its own axis 6 is coupled to the orbiting motion thereof about the central axis 3 of the rotary support 2 by a gearing 10 in such a way that a generally constant angle of attack of the airfoil shaped cross section of the planar fluid dynamic target 1 with respect to the fluid velocity U is maintained. A rotary position transducer comprising a magnet 11 affixed to one flange 8 of the rotary support 2 and a paramagnetic ball 12 rolling on a circular track 13 measures the angular displacement of the planar fluid dynamic target 1 about the orbiting axis 3. The rotary support 2 is under a bias torque provided by a weight 14, which bias torque counteracts the torque resulting from the fluid dynamic force on the planar fluid dynamic target 1.

Figure 3:
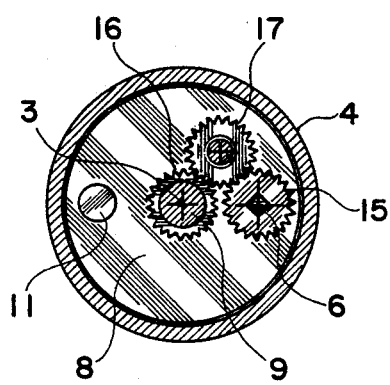
FIG. 3 illustrates a cross section of the embodiment shown in FIG. 2.

In FIG. 3 there is illustrated a cross section of the embodiment shown in FIG. 2, which cross section is taken along plane 3—3 as shown in FIG. 2. The root section of the planar fluid dynamic target includes a gear 15 nonrotatably mounted thereon, which gear 15 is coupled to a stationary gear 16 of the same pitch diameter nonrotatably mounted on the root section of the journal post 9 by a intermediary gear 17 rotatably supported by a post extending from one flange 8 of the rotary support 2. This arrangement of gear coupling allows the planar fluid dynamic target 1 to orbit about the orbiting axis 3 without experiencing any rotation about its own axis 6.

Figure 4:
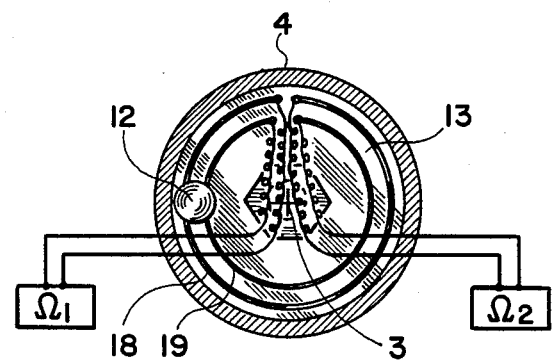
FIG. 4 illustrates another cross section of the embodiment shown in FIG. 2.

In FIG. 4 there is illustrated another cross section of the embodiment shown in FIG. 2, which cross section is taken along plane 4—4 as shown in FIG. 2. A ferromagnetic ball 12 rolls on a circular track 13 concentric to the orbiting axis 3 following the magnet 11 shown in FIG. 2, which track includes two open loop circular elongated conducting members 18 and 19, wherein at least one of the two circular elongated conducting members 18 and 19 has a high specific ohmic resistance. The ferromagmetic ball 12 divides the combination of the two circular elongated conducting members 18 and 19 into a pair of electric circuits. The position of the ferromagnetic ball 12, that is the position of the magnet 11 shown in FIG. 2, is determined by comparing the ohmic resistance $\Omega_1$ and $\Omega_2$ of the pair of electric circuits.

Figure 5:
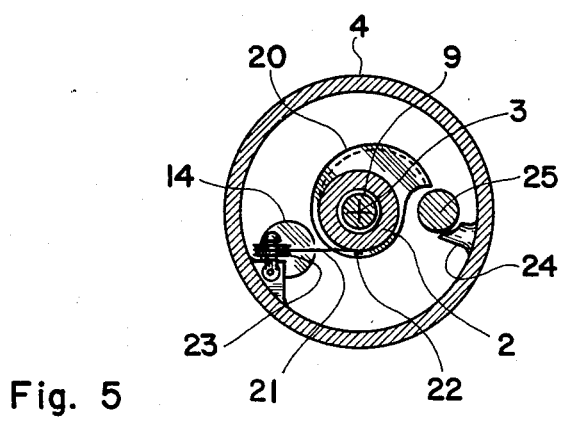
FIG. 5 illustrates a further cross section of the embodiment shown in FIG. 2.

In FIG. 5 there is illustrated a further cross section of the embodiment shown in FIG. 2, which cross section is taken along plane 5—5 as shown in FIG. 2. The rotary support 2 includes a cam 20 guiding the cord 21 anchored to a perimeter of the rotary support 2 at one extremity 22 and weighted at the other extremity by a weight 14, which cord 21 engages one or more idler sheaves 23. The stop 24 acting on the root section 25 of the planar fluid dynamic target 1 defines the position of zero angular displacement corresponding to zero fluid velocity. It should be understood that the length of the torque arm between the orbiting axis 3 and the cam groove wherefrom the cord 21 extends at the position of zero angular displacement must be very small in order to make the bias torque provided by the weight 14 very small and, consequently, even a very low fluid flow registers an angular displacement of a detectable magnitude. Referring to the arrangement illustrated in FIG. 1, even though the position of zero angular displacement corresponding to zero fluid velocity can be disposed in any angular position about the orbiting axis 3, it is generally desirable to select the 6 o'clock position to be the zero angular displacement position corresponding to zero fluid velocity as shown in the particular illustration, for such a selection provides the maximum range of flow measurement between the 6 o'clock position corresponding to zero fluid velocity and the 12 o'clock position corresponding to the maximum fluid velocity.

Figure 6:
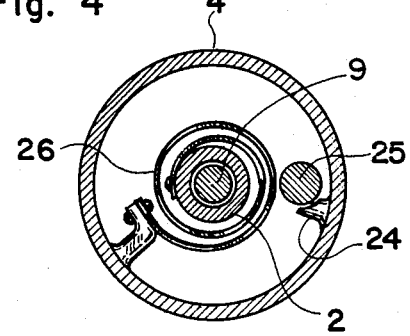
FIG. 6 illustrates a cross section equivalent to that shown in FIG. 5, that illustrates an alternative embodiment.

In FIG. 6 there is illustrated a cross section of an alternative embodiment for providing the bias torque, which cross section is equivalent to that shown in FIG. 5. In this embodiment, a spiral mechanical coil spring 26 with one extremity anchored to the rotary support 2 and the other extremity anchored to the container vessel 4 provides the bias torque in place of the Earth's gravity bias torque employed in the embodiment shown in FIG. 5. It should be noticed that the weight of the planar fluid dynamic target 1 and the root section 25 thereof provides a build-in bias torque, when the flowmeter is installed in a position as shown in FIG. 1, wherein it does not require any additional means for providing a bias torque.

Figure 7:
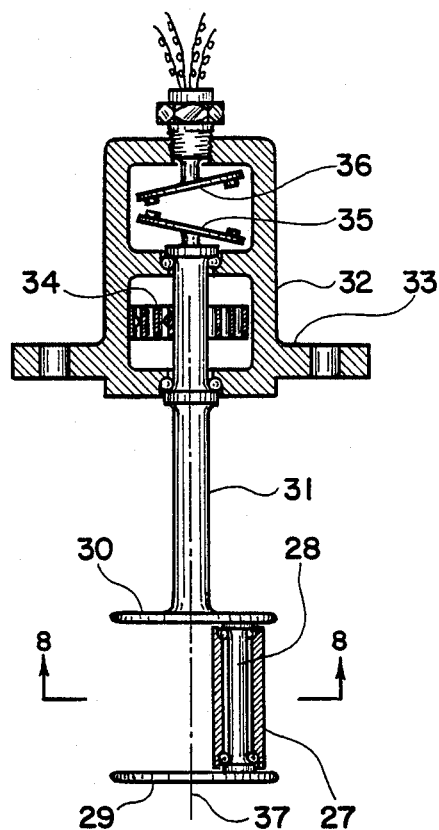
FIG. 7 illustrates another embodiment of the flowmeter comprising a planar fluid dynamic target.

In FIG. 7 there is illustrated another embodiment of the flowmeter constructed in accordance with the principles of the present invention, which comprises a planar fluid dynamic target 27 supported by a journal shaft 28 interconnecting a pair of parallel circular discs 29 and 30 in a free-rotating arrangement. The pair of circular discs 29 and 30 are supported by a stem 31 coaxial thereto and rotatably secured to the anchoring fixture 32 with a mounting flange 33. The bias torque is provided by a spiral mechanical spring 34. The angular position of the planar fluid dynamic target 27 about the orbiting axis 35 is measured by a rotary position transducer comprising a pair of tilted discs 35 and 36 respectively affixed to the stem 31 and the anchoring fixture 32 in a coaxial arrangement, which rotary position transducer may be a capacitive or inductive type. It should be mentioned that the types of the position transducer as well as the methods for providing the bias torque shown in the particular illustrative embodiments merely exemplify a few of many embodiments readily available from the existing arts and practices.

Figure 8:
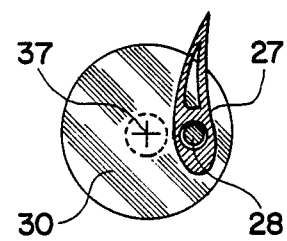
FIG. 8 illustrates a cross section of the flowmeter shown in FIG. 7.

In FIG. 8 there is illustrated a cross section of the flowmeter shown in FIG. 7, which cross section is taken along plane 8—8 as shown in FIG. 7. The planar fluid dynamic target 27 is freely pivotable about the journal shaft 28 disposed in a parallel and eccentric arrangement with respect to the orbiting axis 35. The fluid dynamic torque exerted on the planar fluid dynamic target 27 maintains a constant angle of attack of the airfoil shaped cross section of the planar fluid dynamic target with respect to the fluid velocity during the orbiting motion thereof about the orbiting axis 35. It should be mentioned that the relationship between the angular displacement of the planar fluid dynamic target about the orbiting axis and the dynamic pressure of the fluid flow must be determined empirically and stored in the data processor.

Figure 9:
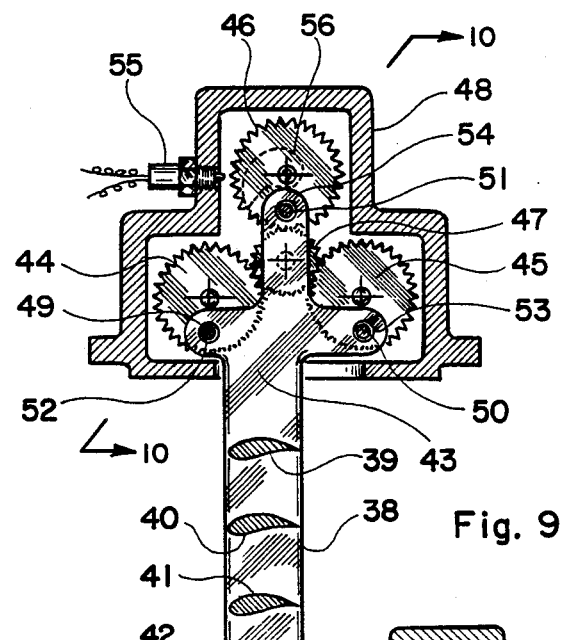
FIG. 9 illustrates a cross section of a further embodiment of the flow-meter comprising one or more planar fluid dynamic targets.

In FIG. 9 there is illustrated a further embodiment of the flowmeter constructed in accordance with the principles of the present invention. An elongated support 38 includes one or more planar fluid dynamic targets 39, 40, 41, 42, etc. having airfoil shaped cross sections which extend laterally from the elongated support 38.

These planar fluid dynamic targets produce drag forces generally perpendicular to the longitudinal axis of the elongated support 38 and generally parallel to the chords thereof, and lift forces generally parallel to the longitudinal axis of the elongated support 38 and generally perpendicular to the chords thereof. One extremity 43 of the elongated support 38 is supported in such a way that the elongated support is orbitable about an orbiting axis generally perpendicular to the airfoil shaped cross sections of the planar fluid dynamic targets without experiencing any pivoting motion. In the particular embodiment illustrated in FIG. 9, such a support is provided by a combination of three gears 44, 45 and 46 having the same pitch diameters, which are simultaneously engaged by a motion coupling gear 47, wherein all gears are rotatably secured to the housing vessel 48. Three posts 49, 50 and 51 respectively extending from the three gears 44, 45 and 46 in an eccentric arrangement engage three holes 52, 53 and 54 included in one extremity 43 of the elongated support 38. A proximity transducer 55 measuring the distance to the edge of the cam-shaped disc 56 measures the angular displacement of the elongated support 38 about the orbiting axis perpendicular to the airfoil shaped cross sections of the planar fluid dynamic targets. One of the four gears 44, 45, 46 and 47 may include a bias torque means and stop means such as those described in conjunction with FIG. 5 or 6. It should be noticed that the combined weight of the elongated member 38 and the planar fluid dynamic targets provides a built-in bias torque in the embodiment shown in FIG. 9 and, consequently, no additional means for providing the bias torque is required, when the flowmeter is installed in a position as shown in FIG. 9. It is clear that the embodiment providing the orbiting support for the elongated support 38 may include only two gears coupled to one another by a third gear instead of the three gears coupled to each other by a third gear. As mentioned in an earlier statement, the selection of the particular type of rotary transducer measuring the angular displacement of the airfoil shaped cross sections of the planar fluid dynamic targets about the orbiting axis is a matter of design. The rotary position transducer including a proximity position detector 55 and the cam-shaped disc 56 may be replaced with other rotary position transducers such as those shown in FIGS. 4 or 7, or other types readily available in the existing art of rotary transducers. The fluid moving from left to right in the illustration shown in FIG. 9 produces drag and lift forces on the planar fluid dynamic targets, which forces create a torque about the orbiting axis and rotate the gears 44, 45 and 46. The relationship between the dynamic pressure and the angular displacement of the gears is determined empirically.

Figure 10:
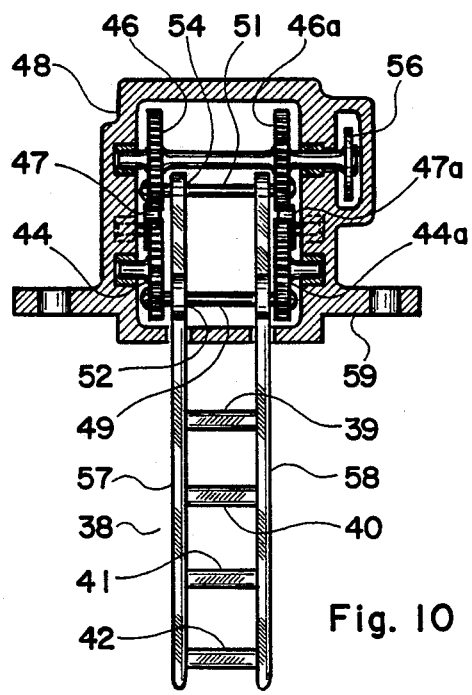
FIG. 10 illustrates an arrangement of the planar fluid dynamic targets, which can be employed in the embodiment shown in FIG. 9.

In FIG. 10 there is illustrated an embodiment of the combination of the elongated support and the planar fluid dynamic target affixed thereto. The elongated support 38 includes a pair of parallel planar members 57 and 58 disposed parallel to the direction of the fluid flow and extending into the fluid stream. The plurality of the planar fluid dynamic targets 39, 40, 41, 42, etc, are disposed across the space between the pair of planar members 57 and 58 at regular intervals and secured thereto. The direction of the fluid flow is perpendicular to the plane of illustration in FIG. 10. The housing vessel 48 has a mounting flange 59 that is to be secured to the wall of the flow passage. It should be noticed that each of the three sets of gears supporting one extremity 43 of the elongated support 38 and the set coupling the motion of the three sets of gears include a pair of gears 44 and 44a, 46 and 46a, 47 and 47a, etc.

Figure 11:
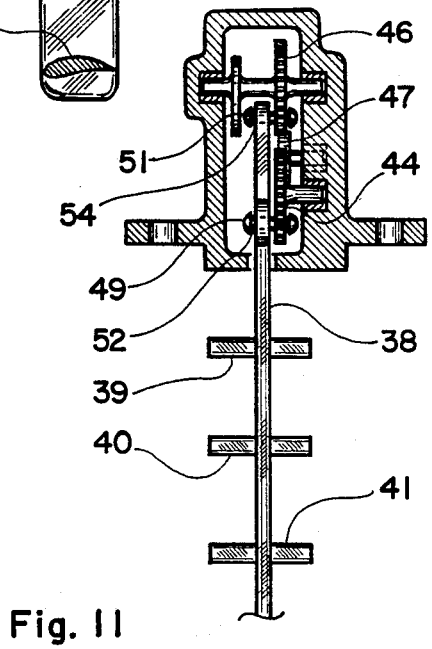
FIG. 11 illustrates another arrangement of the planar fluid dynamic targets, which can be employed in the embodiment shown in FIG. 9.

In FIG. 11 there is illustrated another embodiment of the combination of the elongated support 38 and the planar fluid dynamic targets 39, 40, 41, etc, wherein the planar fluid dynamic targets extend laterally from the planar leongated support in both directions. The direction of the fluid flow is perpendicular to the plane of illustration in FIG. 11. It is noticed that, in this particular embodiment, one extremity of the elongated support 38 is supported by three single gears 44, 45 and 46, which are simultaneously engaged by a fourth single gear 47.

While the principles of the inventions have now been made clear by the illustrative embodiments, there will be many obvious modifications of the structures, arrangements, proportions, elements and materials which are particularly adapted to the specific working environments and operating conditions in the practice of the invention without departing from those principles. It is not desired to limit the inventions to the particular illustrated embodiments shown and, accordingly, all suitable modifications and equivalents may be resorted to falling within the scope of the inventions as defined by the claims which follow.

The embodiments of the invention in which an exclusive property or priviledge is claimed, are as follows :

1. An apparatus for measuring rate of flow comprising in combination:
   (a) a frame including a circular disc rotatable about a first axis generally perpendicular to the circular disc and passing through the center of the circular disc;
   (b) a planar fluid dynamic target disposed on a plane generally parallel to and off-set from said first axis, said fluid dynamic target extending from said circular disc and supported by said circular disc in a pivotable arrangement sbout a second axis parallel to and off-set from said first axis;
   (c) means for maintaining a generally constant angle of attack relative to a reference direction perpendicular to said second axis for the planar fluid dynamic target, said reference direction representing flow direction, wherein fluid dynamic force on the planar fluid dynamic target exerted by fluid moving in a direction generally perpendicular to said second axis produces a fluid dynamic torque causing rotation of the planar fluid dynamic target about said first axis in a first direction;
   (d) means for providing a bias torque causing rotation of the planar fluid dynamic target about said first axis in a second direction opposite to said first direction; and
   (e) means for measuring angle of rotation of the planar fluid dynamic target about said first axis as a measure of fluid flow.

2. The combination as set forth in claim 1 wherein said means for maintaining a generally constant angle of attack comprises a first gear nonrotatably disposed coaxially to said first axis, and second gear disposed coaxially to said second axis and affixed to the planar fluid dynamic target, wherein a third idler gear simultaneously engages said first and second gears.

3. The combination as set forth in claim 2 wherein said means for maintaining a generally constant angle of attack is disposed on one side of said circular disc opposite to the other side including the planar fluid dynamic target.

4. The combination as set forth in claim 1 wherein said means for maintaining a generally constant angle of attack comprises a streamlined cross section of the planar fluid dynamic target with an extended trailing edge, which generates a fluid dynamic torque about said second axis that maintains the generally constant angle of attack.

5. An apparatus for measuring rate of flow comprising in combination:
(a) a frame including a stationary planar member;
(b) an elongated member disposed generally perpendicular to said stationary planar member and extending from said stationary planar member, wherein said elongated member is supported by said stationary planar member in a rotating relationship about a first axis perpendicular to said stationary planar member and coinciding with the central axis of said elongated member;
(c) a planar fluid dynamic target disposed on a plan generally parallel to and off-set from said first axis, said fluid dynamic target rotatably supported about a second axis parallel to and off-set from said first axis by at least one circular disc coaxially affixed to said elongated member;
(d) means for maintaining a generally constant angle of attack relative to a reference direction perpendicular to said second axis for the planar fluid dynamic target, said reference direction representing flow direction, wherein fluid dynamic force on the planar fluid dynamic target exerted by a fluid moving in a direction generally perpendicular to said second axis produces a fluid dynamic torque causing rotation of the planar fluid dynamic target about said first axis in a first direction;
(e) means for providing a bias torque causing rotation of the planar fluid dynamic target about said first axis in a second direction opposite to said first direction; and
(f) means for measuring angle of rotation of the planar fluid dynamic target about said first axis as a measure of fluid flow.

6. The combination as set forth in claim 5 wherein said means for maintaining a generally constant angle of attack comprises a first gear nonrotatably disposed coaxially to said first axis, and second gear diaposed coaxially to said second axis and affixed to the planar fluid dynamic target, wherein a third idler gear simultaneously engages said first and second gears.

7. The combination as set forth in claim 5 wherein said means for maintaining a generally constant angle of attach comprises a streamlined cross section of the planar fluid dynamic target with an extended trailing edge, which generates a fluid dynamic torque about said second axis that maintains the generally constant angle of attack.

* * * * *